United States Patent
Sivo et al.

(10) Patent No.: US 10,222,298 B2
(45) Date of Patent: Mar. 5, 2019

(54) SYSTEM AND METHOD FOR ASSISTING WITH THE DIAGNOSIS OF THE OPERATING CONDITION OF A ROTARY MACHINE

(71) Applicant: HOWDEN SOLYVENT-VENTEC, Meyzieu (FR)

(72) Inventors: Michel Sivo, Ecuisses (FR); Alain Bernard Dominique Louisot, Le Bois D'oingt (FR); Didier Francois Hugues Amor, Levignac (FR)

(73) Assignee: Howden Solyvent-Ventec, Meyzieu (FR)

( * ) Notice: Subject to any disclaimer, the term of this patent is extended or adjusted under 35 U.S.C. 154(b) by 179 days.

(21) Appl. No.: 15/108,920

(22) PCT Filed: Dec. 30, 2014

(86) PCT No.: PCT/FR2014/053582
§ 371 (c)(1),
(2) Date: Jun. 29, 2016

(87) PCT Pub. No.: WO2015/101755
PCT Pub. Date: Jul. 9, 2015

(65) Prior Publication Data
US 2016/0327453 A1 Nov. 10, 2016

(30) Foreign Application Priority Data
Dec. 30, 2013 (FR) ...................................... 13 63709

(51) Int. Cl.
*G05B 23/02* (2006.01)
*G01M 13/02* (2006.01)
(Continued)

(52) U.S. Cl.
CPC ............ *G01M 15/12* (2013.01); *G01M 13/02* (2013.01); *G01M 13/028* (2013.01);
(Continued)

(58) Field of Classification Search
CPC .... G01M 13/02; G01M 13/028; G01M 15/05; G01M 15/12; G05B 23/0227; G05B 23/0213
(Continued)

(56) References Cited

U.S. PATENT DOCUMENTS 3,315,522 A * 4/1967 Frarey ..................... G01H 3/00
73/659
3,952,566 A * 4/1976 Jacobson ................ F16C 19/52
73/10

(Continued)

FOREIGN PATENT DOCUMENTS

| CN | 101135894 A | 3/2008 |
| EP | 2 172 887 A2 | 4/2010 |

(Continued)

OTHER PUBLICATIONS

European Office Action in corresponding EP Application No. 14831043.6-1001, dated Jan. 11, 2018.

*Primary Examiner* — J M Saint Surin
(74) *Attorney, Agent, or Firm* — Edell, Shapiro & Finnan, LLC

(57) ABSTRACT

The invention relates to a system (100) for assisting with the diagnosis of the operating condition of at least one industrial rotary machine (M1, M2, M3), consisting of an industrial electric fan unit, or an industrial motorized pump unit including a pumping wheel, said diagnosis assistance system (100) including a base support (50) and a means (10) for receiving signals (S1, S2, S3) secured to the base mounting (50), the means (10) for receiving signals (S1, S2, S3) being
(Continued)

designed such as to receive signals (S1, S2, S3) representing raw values (6) of at least one operating parameter of the rotary machine (M1, M2, M3), characterized in that the system (100) also includes a means (20) for interpreting the operating condition designed such as to automatically interpret the raw values (6) received and to generate a diagnosis (De) of the operating condition of the rotary machine (M1, M2, M3) in accordance with said raw values (6). The invention can be used in the field of rotary-machine maintenance.

25 Claims, 3 Drawing Sheets

(51) Int. Cl.
G01M 15/05 (2006.01)
G01M 15/12 (2006.01)
G01M 13/028 (2019.01)

(52) U.S. Cl.
CPC ......... *G01M 15/05* (2013.01); *G05B 23/0213* (2013.01); *G05B 23/0227* (2013.01)

(58) Field of Classification Search
USPC .......................................................... 73/660
See application file for complete search history.

(56) References Cited

U.S. PATENT DOCUMENTS

| | | | |
|---|---|---|---|
| 6,763,312 B1* | 7/2004 | Judd | G01H 1/003 |
| | | | 702/56 |
| 8,810,173 B2* | 8/2014 | Li | H02P 29/0241 |
| | | | 318/400.12 |
| 2002/0083772 A1* | 7/2002 | Sonnichsen | G01H 1/006 |
| | | | 73/660 |
| 2004/0123600 A1 | 7/2004 | Brunell et al. | |
| 2006/0070435 A1 | 4/2006 | LeMieux | |
| 2010/0280797 A1 | 11/2010 | Erichsen | |
| 2015/0308285 A1* | 10/2015 | Falb | F03D 9/257 |
| | | | 73/112.01 |

FOREIGN PATENT DOCUMENTS

| | | | |
|---|---|---|---|
| EP | 2172887 A2 | | 4/2010 |
| JP | 2011102700 | * | 5/2011 |
| WO | WO9011516 | * | 4/1990 |
| WO | WO2015087732 | * | 6/2015 |

* cited by examiner

SYSTEM AND METHOD FOR ASSISTING WITH THE DIAGNOSIS OF THE OPERATING CONDITION OF A ROTARY MACHINE

CROSS-REFERENCE TO RELATED APPLICATIONS

This application is a § 371 national stage of PCT International Application No. PCT/FR2014/053582, filed Dec. 30, 2014, claiming priority of French Patent Application No. FR 20130063709, filed Dec. 30, 2013, the content of each of which is hereby incorporated by reference into the application.

TECHNICAL FIELD

The present invention relates to the general technical field of industrial maintenance of rotary machines, such as industrial fans, and in particular it relates to systems and methods enabling failures to be detected or predicted.

The present invention relates more particularly to a diagnosis assistance system for diagnosing the operating state of at least one industrial rotary machine formed by an industrial motor-and-fan unit comprising a motor and a fanwheel driven in rotation by said motor, or by an industrial motor-and-pump unit including a pump wheel, said diagnosis assistance system comprising a base support and reception means for receiving signals, the reception means being secured to the base support, the reception means for receiving signals being designed to receive signals representative of raw values of at least one operating parameter of said at least one rotary machine, the raw values being picked up within said at least one rotary machine.

The invention also relates to a diagnosis assistance method for diagnosing the operating state of at least one industrial rotary machine formed by an industrial motor-and-fan unit comprising a motor and a fanwheel driven in rotation by said motor, or by an industrial motor-and-pump unit including a pump wheel, said diagnosis assistance method comprising a step of receiving signals representative of raw values of at least one operating parameter of said at least one rotary machine, the raw values being picked up within said at least one rotary machine.

The invention also relates to a medium suitable for being read by a computer and storing operating software.

PRIOR ART

A system is known for recovering signals coming from a rotary machine, in particular an industrial type fan, provided with rotary elements such as a shaft or a fan, said system enabling a user to perform verifications and to read information about the operating state of the machine, in particular in order to be in a position to anticipate future failures, or to detect malfunctions, if any.

That known system comprises a box that is designed to be closed and locked, and that is generally applied to the machine itself or in the proximity thereof, e.g. on a wall. The box of that known system is designed to protect and contain a reception device for receiving signals that enables signals from the machine to be received and stored, in particular electrical signals transmitted by sensors within the core of said machine. As a general rule, those sensors are mostly in the form of vibration sensors (e.g. accelerometers) placed on rotary or non-rotary elements of the machine, such as bearings, ball bearings, shafts, or fan blades. Those sensors may also be in the form of sensors for sensing the speed of rotation of rotary elements, for sensing torque, for sensing temperature, or for measuring sound. In substance, the sensors are designed to pick up parameters that, on being analyzed, enable the operating state of the machine to be assessed, and for enabling said parameters to be transmitted in the form of electrical signals to the reception device, generally via electric cables passing through a wall of the box.

Before being able to process and analyze the parameters in question, the user needs to connect a computer having a specific acquisition card to the signal reception device situated inside the box in order to have a man-machine interface. The acquisition card of the computer is designed to be connected to the reception device via one or more communications cables, and connecting the cables requires the box to be unlocked and opened. Such an operation can only be undertaken by an approved user, preferably an expert who has the necessary access rights, e.g. in the form of a key corresponding to a lock of the box, or an unlocking combination that the user remembers, for unlocking a padlock that otherwise blocks access to the contents of the box.

Access to the content of a box is thus restricted to approved users. In contrast, whatever the nature or the importance of the verification that is to be performed, it is necessary to make use of means that are quite substantial, namely a user with a high level of expertise, having a maintenance computer with a specific acquisition card, and access rights to the box, which can turn out to be expensive in terms of time and of logistics, even though it is essential for guaranteeing maintenance of the industrial fan. In practice, in an industrial context, it can sometimes be difficult and expensive to have such an approved user with rare skills available, together with analysis equipment that is also available.

The time required by the approved user to take action is also increased by the fact that each time the user opens the box, it is necessary to connect the maintenance computer correctly to the reception device and to configure said computer correctly in order to be in a position to process and analyze the operating parameters of the industrial fan. On this topic, it is necessary for the approved user to be capable of detecting any connection error or configuration error in order to guarantee that the analysis is reliable, which constitutes an additional difficulty.

The approved user analyses the operating parameters on the maintenance computer, which parameters appear in raw and non-processed form. For this purpose, the user organizes and generally sorts the data, and puts it into form by using software, e.g. in the form of graph as a function of time or as a function of frequency spectrum (e.g. using a Fourier transform). By performing frequency analysis on the vibrations to which the industrial fan is subjected, and in the light of the user's know-how and experience, the user is in a position to associate the frequency behavior of certain parameters (in particular the presence or the absence of characteristic harmonics) with a known operating state. For example, a balancing problem may be manifested by a high level of vibration at the frequency of rotation of the industrial fan, whereas poor alignment is more likely to give rise to a high level of vibration at harmonics of the frequency of rotation of the machine. Specifically, this type of analysis can thus enable the approved user to detect unbalance or misalignment of the rotating parts of the industrial fan. Time analysis serves to detect an impact, or aging of a part, in particular giving rise to variation in a parameter over time, for example.

The approved user must therefore have sufficient knowledge to be capable of analyzing the parameters individually and manually (in particular when performing vibratory analysis of the parameters) in order to end up with a complete and reliable diagnosis about the operating state of the industrial fan. Consequently, providing such a diagnosis consumes a considerable quantity of time and can be found to be tedious. Furthermore, the approved user has no way of verifying that the analysis is well founded, so the user is the only judge of the nature of any malfunction that might have been detected, and is alone responsible for how the data is interpreted, and for the consequences thereof, e.g. in terms of the reliability of the industrial process with which the fan is associated, or in terms of safety that might result from a malfunction that is not detected or that is wrongly detected.

Finally, although the prior art system is found to be sufficient and appropriate in certain situations, it nevertheless appears to be ill-adapted for being performed by a user who is inexperienced in terms of analyzing operating parameters, and the prior art system can also be improved in numerous resects, in particular in terms of cost and of maintenance time.

SUMMARY OF THE INVENTION

The objects given to the present invention consequently seek to provide a remedy to the above-mentioned drawbacks of the prior art and to propose a novel system and a novel method of assisting diagnosis that make it possible easily, quickly, and flexibly to ensure that an industrial rotary machine is properly maintained.

Another object of the invention is thus to propose a novel diagnosis assistance system and method that can be used by users having no particular qualification or expertise in the field of industrial maintenance.

Another object of the invention is thus to propose a novel diagnosis assistance system and method that, while enabling the operating state of industrial rotary machines to be analyzed completely and reliably, also enables the duration and the difficulty of such analysis to be reduced.

Another object of the invention is thus to propose a novel diagnosis assistance system and method that serve to reduce the cost of maintenance operations.

Another object of the invention is thus to propose a novel diagnosis assistance system and method that contribute to ensuring safety in an industrial environment.

Another object of the invention is thus to propose a novel diagnosis assistance system and method of design that is robust and appropriate for an industrial context.

Another object of the invention is thus to propose a novel diagnosis assistance system and method that are adaptable as a function of the level of competence of the user.

Another object of the invention is thus to propose a novel diagnosis assistance system and method that are compatible with any industrial equipment.

The objects given to the invention are achieved with the help of a diagnosis assistance system for diagnosing the operating state of at least one industrial rotary machine formed by an industrial motor-and-fan unit comprising a motor and a fanwheel driven in rotation by said motor, or by an industrial motor-and-pump unit including a pump wheel, said diagnosis assistance system comprising a base support and reception means for receiving signals, the reception means being secured to the base support, the reception means for receiving signals being designed to receive signals representative of raw values of at least one operating parameter of said at least one rotary machine, the raw values being picked up within said at least one rotary machine, the system being characterized in that it also comprises interpretation means for interpreting the operating state and designed to act automatically to interpret the received raw values and to generate a diagnosis about the operating state of said at least one rotary machine as a function of said raw values.

The objects given to the invention are also achieved with the help of a diagnosis assistance method for diagnosing the operating state of at least one industrial rotary machine formed by an industrial motor-and-fan unit comprising a motor and a fanwheel driven in rotation by said motor, or by an industrial motor-and-pump unit including a pump wheel, said diagnosis assistance method comprising a step of receiving signals representative of raw values of at least one operating parameter of said at least one rotary machine, the raw values being picked up within said at least one rotary machine, the method being characterized in that it also comprises an automatic interpretation step of automatically interpreting received raw values and a step of generating a diagnosis about the operating state of said at least one rotary machine as a function of said raw values.

The objects given to the invention are also achieved with the help of a medium suitable for being read by a computer and storing operating software, the medium being characterized in that the operating software enables the automatic interpretation step and the step of generating the diagnosis of the diagnosis assistance method to be performed.

BRIEF SUMMARY OF THE DRAWINGS

Other features and advantages of the invention appear and can be seen in greater detail on reading the following description made with reference to the accompanying drawings that are given purely by way of non-limiting illustration, and in which.

BEST MANNER OF PERFORMING THE INVENTION

Figure 1:
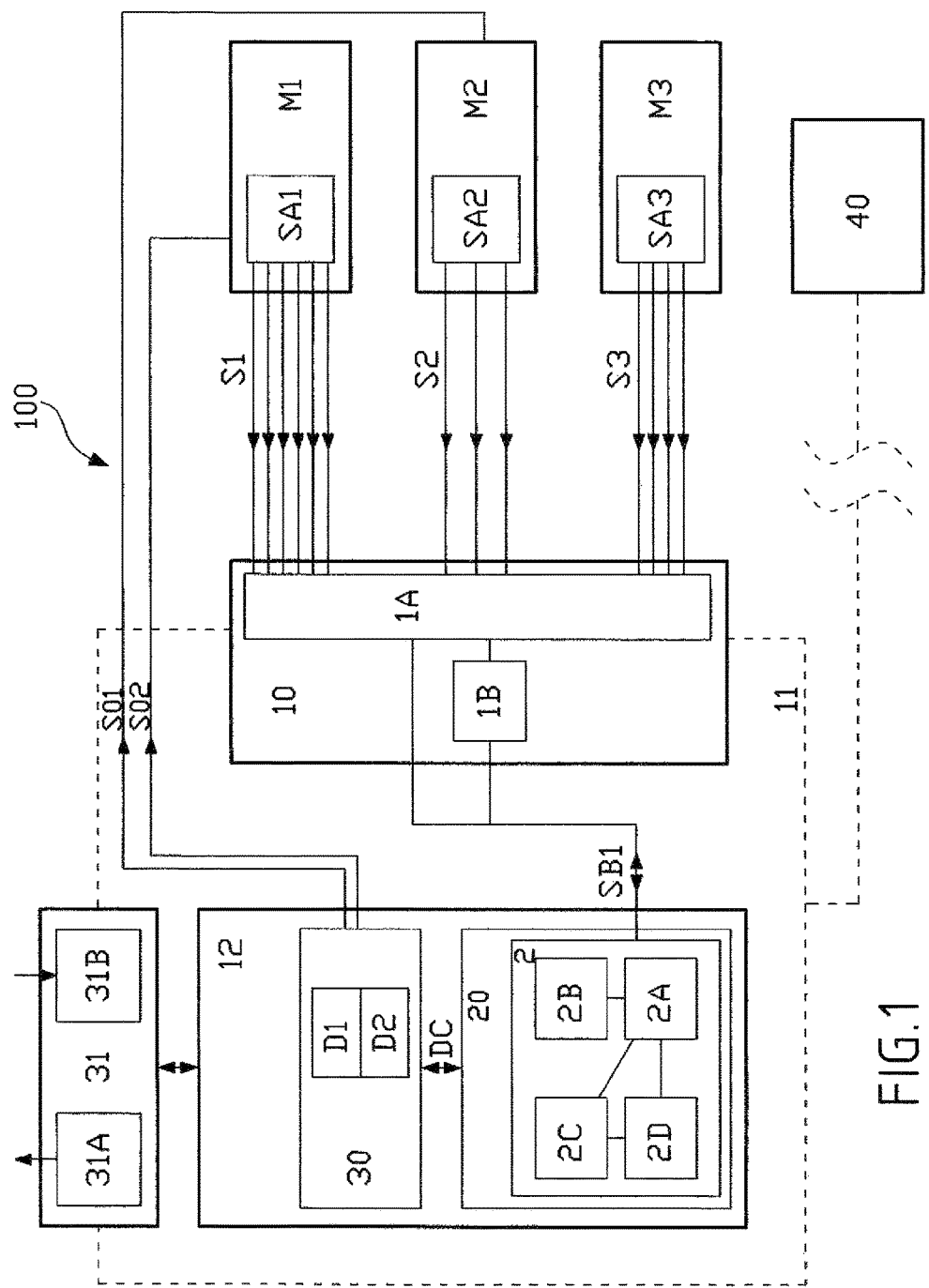
FIG. 1 is a block diagram representing symbolically the operation of a diagnosis assistance system of the invention.

The invention relates to a diagnosis assistance system 100 designed to be installed and used in an industrial or professional context.

The system 100 is for providing a user with assistance in diagnosing the operating state of at least one industrial rotary machine M1, M2, M3 such as a rotary fan or pump, and formed by an industrial motor-and-fan unit comprising a motor and a fanwheel driven in rotation by said motor, or formed by an industrial motor-and-pump unit including a pump wheel. The rotary machine M1, M2, M3 under diagnosis comprises at least one rotary element, e.g. enabling it to perform a pumping, ventilation, driving, or energy-producing action. By way of example, the rotary element may be in the form of a pump wheel, a fanwheel, a motor wheel, or an alternator turbine. The diagnosis assistance system 100 is designed to provide assistance in providing a diagnosis Dc about the operating state of a rotary machine M1, M2, M3 that is an industrial motor-and-fan unit or an industrial motor-and-pump unit. Said at least one rotary machine M1, M2, M3 is thus preferably a motor-and-fan unit comprising a motor and a fanwheel, the motor being designed to drive the fanwheel in rotation and preferably being an electric motor. Said at least one rotary machine M1, M2, M3 is alternatively a motor-and-pump unit, preferably comprising a motor, e.g. an electric motor, and a pump wheel driven by said motor.

Preferably, said at least one rotary machine M1, M2, M3 is an industrial fan for an industrial motor-and-pump unit, i.e. it is designed for use that is industrial as contrasted with domestic, for example. Under such circumstances, it is thus associated by way of example with an industrial method, a production line or premises, a system for ventilating an office block, or indeed a machine that serves to ventilate, depollute, or cool. Preferably, said at least one rotary machine M1, M2, M3 may be in the form of a rotary pump or a rotary compressor, and under such circumstances it is for pumping a fluid by centrifugal force or by mechanically driving the fluid, in an industrial process, in which case it is associated either with a production machine, or placed at the core of the operation of said machine. Preferably, the rotary machine M1, M2, M3 is secured to a stationary structure, such as for example a factory, a system for ventilating a building, a machine, or an industrial installation, and it may by way of example be fastened to the floor or to a wall or to a ceiling of a building or of a room.

In the invention, the terms "motor-and-pump unit" means a unit having both a motor and pumping means driven by said motor. Likewise, the term "motor-and-fan unit" means a unit comprising both a motor and fan means driven by said motor.

Preferably, said at least one rotary machine M1, M2, M3 is advantageously associated with an industrial process, and is preferably essential for proper operation of that process. Thus, it is necessary to ensure that said at least one rotary machine M1, M2, M3 is unlikely to fail at an inopportune moment, since any malfunction may be of a kind that affects the industrial process with which said at least one rotary machine M1, M2, M3 is associated, or even interrupts it in particularly harmful manner. For this purpose, it is necessary to monitor the operating state of said at least one machine, i.e. to be capable of analyzing whether each of its component elements is in a functional state that is suitable for enabling said at least one industrial machine to operate properly at present and/or in the future. In the context of the invention, it is thus necessary to make a diagnosis Dc about the operating state of said at least one rotary machine M1, M2, M3, which means performing such an analysis of the state of the component elements of said at least one rotary machine M1, M2, M3 by observing and interpreting symptoms or behaviors of said at least one rotary machine M1, M2, M3.

Preferably, the diagnosis Dc comprises signaling that one or more faults, if any, has/have been detected. As non-limiting examples, such faults may be an unbalance (caused by wear, or by losing a fan blade, for example), misalignment, shaft curvature, a connection fault between a pulley and a belt (associated with a problem of tensioning, of alignment, or of irregularity in the connection), abnormal slack, abnormal vibration, abnormal noise, impact, abnormal temperature, a bearing fault, a rolling bearing fault (in particular in one of its rings, or in one of its rolling elements, as a result of wear, oxidation, or breakage), a gear fault (in particular wear of teeth, adjusting clearance of a discharge cover), etc.

Thus, in the invention, the diagnosis assistance system 100 contributes to enabling a user to obtain the diagnosis Dc, such that the user is in a position to monitor or inspect the operating state of said at least one rotary machine M1, M2, M3, e.g. for the purpose of performing a maintenance action, preferably a preventative maintenance action, or indeed a predictive maintenance action, on said at least one rotary machine M1, M2, M3.

In the invention, the system 100 comprises a base support 50 and signal reception means 10 for receiving signals S1, S2, S3, which means are secured to the base support 50. The base support 50 acts as a stand for the means 10 for receiving signals S1, S2, S3. The base support 50 may be attached either to said at least one rotary machine M1, M2, M3, or to a stationary element such as a wall, the floor, or a pylon, e.g. belonging to the workshop in which said at least one rotary machine M1, M2, M3 is installed, or to a control room situated nearby. The base support 50 is preferably designed to be placed close to said at least one rotary machine M1, M2, M3. The base support 50 also serves optionally to isolate the means 10 for receiving signals S1, S2, S3 from the outside for the purpose of protecting them from the industrial environment in which they are placed (e.g. a source of moisture, and/or of heat, and/or of projections that would be harmful for operation), and/or to prevent an inexperienced user from accessing said means 10 for receiving signals S1, S2, S3 in order to ensure the safety of said user, and in order to guarantee the integrity of said means 10 for receiving signals S1, S2, S3.

Figure 3:
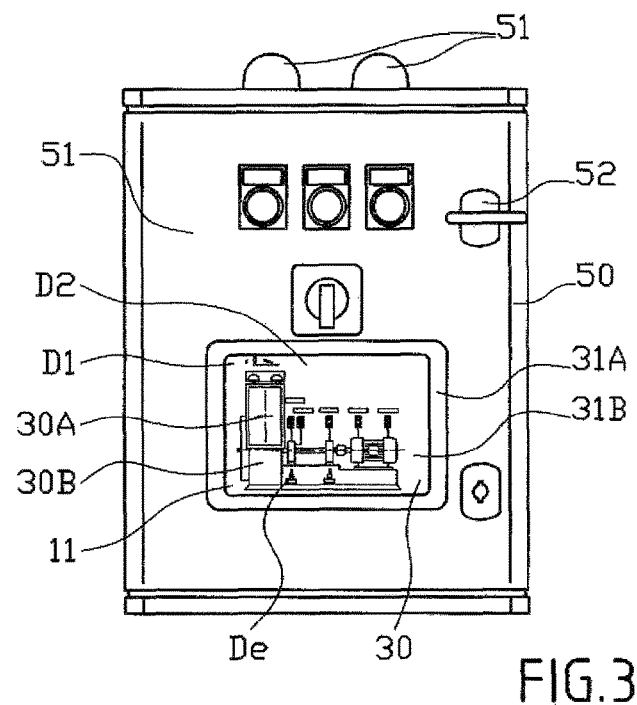
FIG. 3 is a face view of a base support of the FIG. 1 diagnosis assistance system of the invention.

In a preferred variant of the invention, the base support 50 as shown in FIG. 3 comprises a housing, such as a chest or box, designed to be closed and locked using a door 51 of said housing, which door can be opened only by an experienced user, the means 10 for receiving signals S1, S2, S3 being placed inside said housing. The housing is preferably made of metal or of opaque plastics material, being generally rectangular in shape, having a front door 51 designed to pivot on hinges and including locking means 52 such as a lock. The housing preferably also has a vertical back wall and a floor, one of which enables the base support 50 to be fastened to a stationary element such as a wall, a pillar, the ground, a rack, or said at least one rotary machine M1, M2, M3 itself, like a conventional box.

Whether or not it is protected by a housing, the means 10 of the invention for receiving signals S1, S2, S3 as designed to receive signals S1, S2, S3 coming from said at least one rotary machine M1, M2, M3 (as shown in FIG. 1), said signals S1, S2, S3 being representative of raw values 6 for at least one operating parameter of said at least one rotary machine M1, M2, M3.

Thus, the signals S1, S2, S3 are representative of at least one operating parameter of said at least one rotary machine M1, M2, M3, said at least one operating parameter being potentially useful in generating a diagnosis Dc about the operating state of said at least one rotary machine M1, M2, M3, e.g. by revealing meaningful symptoms or physical magnitudes about the operating state.

The signals S1, S2, S3 preferably represent a plurality of operating parameters such as speed and/or acceleration and/or vibration and/or temperature and/or torque and/or force and/or sound measurement and/or measured electrical power consumption for one or more functional components of said at least one rotary machine M1, M2, M3, this list of operating parameters naturally being given by way of non-limiting illustration. The functional components are preferably parts or elements that are important for the operation of said at least one rotary machine M1, M2, M3 and that have more or less direct influence on its operating state, such as bearings, rolling bearings or their rings, fan blades, shafts, motor rotors, etc. This list is naturally likewise given by way of non-exhaustive illustration.

The means 10 for receiving signals S1, S2, S3 thus enable the information sent from said at least one rotary machine M1, M2, M3 to be received specifically in the form of signals S1, S2, S3 or in the form of coded messages. In the invention, the raw values 6 are picked up within said at least one rotary machine M1, M2, M3 (as shown in FIG. 1). The signals S1, S2, S3 then act as means for conveying raw values 6 that are taken from said at least one rotary machine M1, M2, M3 to the means 10 for receiving signals S1, S2, S3.

Preferably, the reception means 10 comprise reception ports 1A designed to receive the signals S1, S2, S3 and to extract therefrom the raw values 6, e.g. by decoding or merely by reading them, so as to convert said signals S1, S2, S3 (when they are physical signals) into meaningful data about the raw values 6, and/or into signals of some other nature, that can be interpreted by other elements of the diagnosis assistance system 100. The reception means 10 may optionally ensure that all of the signals S1, S2, S3 sent from said at least one rotary machine M1, M2, M3 have been properly received, e.g. by performing parity verification or a cyclic redundancy check, and they may also organize the signals, e.g. classifying them by time of reception, or by the type of raw value 6 that is received.

Preferably, the ports 1A are adapted to receive the signals S1, S2, S3 in the form of electrical or electromagnetic signals transmitted by sensors SA1, SA2, SA3 arranged within said at least one rotary machine M1, M2, M3. The ports 1A are thus connected to the sensors SA1, SA2, SA3 by wired electrical or optical connections or by wireless connections, e.g. by using electromagnetic waves. The sensors SA1, SA2, SA3 are preferably arranged in the proximity of, on, or inside functional components of said at least one rotary machine M1, M2, M3 in order to pick up the raw values 6 of said at least one operating parameter.

Preferably, the reception means 10 also comprise a memory 1B in which the raw values 6 received over a predetermined duration are stored (as shown in FIG. 1). The memory 1B advantageously enables the reception means 10 to conserve the raw values 6 taken over a predetermined duration for the purpose of future processing.

Preferably, the reception means 10 include a sufficient number of ports 1A to receive the raw values 6 of one or more operating parameters, preferably one to six operating parameters, from one or more industrial rotary machines, preferably one to four industrial rotary machines. Thus, the reception means 10 may receive, preferably continuously, a plurality of operating parameters from a plurality of industrial rotary machines, said industrial rotary machines being machines that are identical, or that are of the same type, or that are of types that are different from one another.

According to an important characteristic of the invention, the diagnosis assistance system 100 also includes interpretation means 20 for interpreting the operating state and designed to interpret automatically the raw values 6 that have been received and to generate a diagnosis Dc about the operating state of at least one rotary machine M1, M2, M3 as a function of said raw values 6 (as shown in FIG. 1).

In the meaning of the invention, the term "automatically" is used to indicate partial or total absence of intervention on the part of the user in interpreting the raw values 6. The interpretation means 20 act on their own to draw up a partial or even a complete interpretation of the operating state of said at least one rotary machine M1, M2, M3 on the basis of the raw values 6 received by the reception means 10, and preferably as stored and decoded thereby. Like a human being, the interpretation means 20 analyze the raw values 6 of said at least one operating parameter in order to draw conclusions about the operating state of said at least one rotary machine M1, M2, M3, e.g. by making the raw values 6 available to technical or physical calculations, and/or to predetermined models for estimating said operating state.

The diagnosis assistance system 100 is designed in such a manner (preferably with the help of an interface device 31 as described below) that the user can have access to the diagnosis Dc that is generated. This makes it possible advantageously for the user to obtain the diagnosis Dc about the operating state of said at least one rotary machine M1, M2, M3 without necessarily having special competence in interpreting the operating parameters. For example, by accessing the diagnosis Dc, the user can thus immediately discover, regardless of the user's own level of competence, whether said at least one rotary machine M1, M2, M3 is functioning, or presents a malfunction, whether maintenance needs to be performed soon, whether a functional component of said at least one rotary machine M1, M2, M3 in particular has failed, with the interpretation means 20 informing said user, in real time and/or on demand from the user, by producing the diagnosis Dc in such a manner as to make it readable and interpretable independently of the level of competence of said user.

In order to receive the raw values 6 from the reception means 10, the interpretation means 20 are designed to communicate therewith, and for this purpose they are connected to said reception means 10, e.g. by a wired or wireless connection, or via a data bus SB1 (as shown in FIG. 1). Naturally, the reception means 10 may communicate with the interpretation means 20 by any known means. The reception means 10 are designed to convert the raw values 6 as received into raw values 6 that are readable by the interpretation means 20.

Preferably, the interpretation means 20 are also placed inside the housing of the base support 50, so as to be isolated from the outside, like the reception means 10, and so as to be in contact therewith (thereby enabling communication to be simplified). Nevertheless, without going beyond the ambit of the invention, it is possible to envisage placing the interpretation means 20 remotely, in which case they need to be designed to communicate remotely with the reception means 10, and to generate the diagnosis Dc remotely. By way of example, this may make it possible for a maintenance team to access the diagnosis Dc from a point that is remote from said at least one rotary machine M1, M2, M3, preferably from a room that is different from the room in which said at least one rotary machine M1, M2, M3 is located, or more preferably from a building that is different, or even more preferably, from a region that is different.

The interpretation may be performed for the instantaneous operating state, i.e. the operating state substantially at the moment when the raw values of the operating parameters are measured, the reception means 10 then being designed to receive the raw values 6 substantially directly in discrete or continuous manner. Interpretation is then performed by the interpretation means 20 on the basis of raw values 6 that have been stored over a period of time starting in the past and terminating at the present. Interpretation may also be performed in order to determine the operating state over a given period of time in the past, the interpretation means 20 then relying on raw values 6 that have been stored by the reception means 10 over a time interval in the past.

Thus, the interpretation means 20 are preferably designed to make use of raw values 6 received over a predetermined duration by the reception means 10, the reception means including the memory 1B storing the raw values 6 as received over a predetermined duration.

Advantageously, the interpretation means 20 include means for calculating the air flow efficiency of the rotary machine M1, M2, M3, which is formed by a motor-and-fan unit or by a motor-and-pump unit, in particular when the machine is a motor-and-fan unit, by making use in particular of the following operating parameters received by the reception means 10 by virtue of appropriate sensors being present that are placed in the core of said motor-and-fan unit:

dynamic pressure;
static pressure across the fanwheel;
temperature on the suction side of the fanwheel;
speed of rotation of the fanwheel;
load factor of the motor; and
electrical power drawn by the motor.

Preferably, automatic interpretation is performed and/or the diagnosis Dc is generated at regular time intervals, or indeed continuously, so as to keep the user informed about the instantaneous operating state (i.e. the present operating state) of said at least one rotary machine M1, M2, M3: in this configuration, the diagnosis assistance system 100 makes it possible to monitor the operating state of said at least one rotary machine M1, M2, M3. Preferably, interpretation may be performed and/or the diagnosis Dc may be generated, at the request of the user.

Preferably, and in particularly advantageous manner, the interpretation means 20 may be designed to perform interpretation and to generate the diagnosis Dc in instantaneous manner, or at least more quickly than could be done by the user if the user were to perform the interpretation and generate said diagnosis Dc manually and/or mentally, relying on competence in analyzing and interpreting raw values 6 of operating parameters, and carrying out the calculations directly.

The interpretation means 20 preferably follow a predetermined method for interpreting the raw values 6 and for generating the diagnosis Dc, and for this purpose they comprise an association algorithm 2 and a state database 2B containing a plurality of known operating states, the association algorithm 2 including an association module 2A enabling the operating state to be associated with one of the known operating states in the state database 2B. The association algorithm 2 preferably comprises a plurality of methods of interpreting the raw values 6 (being presented in the form of algorithmic procedures), and decision-taking means serving to select an interpretation method that is appropriate as a function of the raw values 6 as taken, depending on the situation. Executing said association algorithm 2 then serves to contribute interpreting the raw values 6 in the form of one or more symptoms about the operating state and to generate the diagnosis Dc.

Preferably, the interpretation means 20 also comprise a state database 2B having a plurality of known operating states (e.g. presented in the form of a table or a list), the association algorithm 2 including an association module 2A enabling the operating states to be associated with one of the known operating states in the state database 2B (as shown in FIG. 1).

Thus, the association algorithm 2 preferably includes a method contained in the association module 2A for associating symptoms (as determined by the association algorithm 2 from the raw values 6) with symptoms that arise in the ordinary way in known or in modeled manner in a known operating state. Thus, the association algorithm 2 can associate the operating state with a known operating state in its state database 2B by using the association module 2A, and can thus diagnose the operating state, i.e. by way of example, affirm that a malfunction is present, or on the contrary that a known malfunction is absent.

Preferably, (in order to generate the diagnosis Dc) the interpretation means 20 are designed to interpret the raw values 6 of operating parameters of the type comprising speed and/or acceleration and/or vibration and/or temperature and/or torque and/or force and/or flow rate and/or pressure and/or sound measurement performed on one or more operating components of said at least one rotary machine M1, M2, M3. In general manner, the interpretation means 20 base the generation of the diagnosis Dc on interpreting conventional mechanical parameters, which are representative of the operating state of said at least one rotary machine M1, M2, M3.

Preferably, the association algorithm 2 has a time and/or frequency analysis module 2D (e.g. using a fast Fourier transform (FFT)) serving to perform time and/or frequency analysis on the raw values 6 and to generate an analysis result representing the operating state. Preferably, the association module 2A then makes it possible to compare the result of the analysis with result models of the state database 2B, the result models corresponding to a plurality of known operating states, the association module 2A serving to associate the operating state with one of the known operating states.

One or more time and/or frequency analyses are thus performed automatically in partial or complete manner by the interpretation means 20 so that there is no need for the user of the diagnosis assistance system 100 to have specific competence in the field of frequency and/or time analysis in order to obtain the results of the analysis.

In this situation, the analysis result is compared with the result models listed in the state database 2B. The result models may be in the form of analysis results that are obtained in typical, conventional, or systematic manner for a given known operating state. By comparing the analysis result and the result models, the association module 2A can be in a position to associate the analysis result with at least one result model (if any). Under such circumstances, when said at least one selected result model corresponds to at least one known operating state, the association module 2A can thus compare the operating state associated with the analysis result with said at least one known operating state, in automatic manner, and without user intervention (or with intervention from the user that does not require competence in interpreting raw values 6). For example, the association module 2A can associate a level of vibration at a particular frequency in said at least one rotary machine M1, M2, M3 with a known malfunction, which usually manifests the same level of vibration at that particular frequency.

By way of example, it is known in vibratory frequency analysis of rotary machines that an unbalance fault on a rotating part will lead as a symptom to a high level of vibration of the rotating part at the fundamental frequency of rotation of said rotating part (and at its harmonics). The interpretation means 20 can perform an association algorithm 2 for carrying out such analysis, the unbalance fault then being a known operating state. Where appropriate, the execution of the association algorithm 2 can lead to detecting a high level of vibration at the fundamental and harmonic frequencies of rotation of operating components in said at least one rotary machine M1, M2, M3 by using frequency analysis on the raw values 6. In this example, this thus enables the interpretation means 20 to interpret the operating state as corresponding to the known operating state for this type of unbalance fault, in particular concerning the functional components. Naturally, the association algorithm 2 may be designed to associate any type of known operating state with the type of operating state in similar manner in the event of an unbalance fault.

Executing time analysis can serve for example to enable the interpretation means 20 to determine progressive variation in a functional parameter representative of the wear of a part (e.g. if the temperature or the vibration of the part increases over time), with the interpretation involving associating this type of variation with a known operating state in order to generate the diagnosis Dc. Likewise, the appearance of impacts over time can also serve by way of example to enable the interpretation means 20 to conclude that certain functional components have broken or need replacing.

Preferably, the association algorithm 2 includes a comparison module 2C for comparing the raw values 6 with threshold values of the state database 2B, the threshold values corresponding to a plurality of known operating states, the association module 2A enabling the operating state to be associated with one of the known operating states.

The threshold values may be raw values 6 of said at least one parameter that are obtained in typical, conventional, or systematic manner for a given known operating state. For example, a temperature that is too high relative to a temperature threshold value may be symptomatic of a lack of lubrication.

Thus, when a threshold value is crossed by one of the raw values 6 of one of the functional parameters representing the operating state (e.g. a high temperature, an abnormally high acceleration of an accelerometer, or indeed an abnormally low speed of a functional component), the association module 2A can associate such an operating state with a known operating state.

Naturally, the association algorithm 2 may include both a time and/or frequency analysis module 2D and a comparison module 2C, and it may combine the use of these various modules with one another in order to obtain an interpretation of the raw values that is as close as possible to reality, and generate the best possible diagnosis Dc, or at least the diagnosis that is as close as possible to that which could be obtained by a user having the competence to generate the diagnosis Dc.

Preferably, regardless of whether the analysis involves time and/or frequency and/or comparison 2C, it can also enable the interpretation means 20 to generate a diagnosis Dc predicting a future operating state for said at least one rotary machine M1, M2, M3 from the operating state of said at least one rotary machine M1, M2, M3 on the basis of the raw values 6 of the operating parameters in order to evaluate future consequences of a behavior that is present in said operating parameters. Thus, the diagnosis assistance system 100 may advantageously be capable of predicting wear, need for replacement, or degradation of certain functional components, thus making it possible to have recourse to a predictive maintenance procedure for servicing said at least one rotary machine M1, M2, M3 before a failure or a malfunction occurs.

With reference to the above-described air flow efficiency calculation, the comparison module 2C may be designed to compare the calculated air flow efficiency with a threshold value, below which the motor-and-fan unit is considered as presenting a particular fault. In this way, the interpretation means 20 can automatically generate a diagnosis about the operation of the motor-and-fan unit on the basis of the calculated air flow efficiency value.

In preferred manner, the diagnosis assistance system 100 includes an embedded computer 11, the interpretation means 20 being in the form of operating software 12 loaded into the embedded computer 11 for executing the association algorithm 2 (as shown in FIG. 1). The embedded computer 11 is thus secured to the base support 50 and is preferably placed inside the housing, as shown in FIG. 3. By way of example, the embedded computer 11 may be in the form of an industrial computer, e.g. comprising in conventional manner a memory in which the operating software 12 is to be executed, a processor for executing said operating software 12, and a communications card enabling it to communicate with the reception means 10, for example. The reception means 10 may then preferably be in the form of a peripheral of the embedded computer 11, e.g. in the form of an analog input card designed to receive analog signals S1, S2, S3 from sensors SA1, SA2, SA3 in order to convert them into digital signals readable by said embedded computer 11 by means of its communications card.

Preferably, and in alternative manner, the embedded computer 11 may incorporate both the interpretation means 20 and the reception means 10 as incorporated peripherals.

In preferred manner, the diagnosis assistance system 100 includes an interface device 31 enabling a user to access the diagnosis Dc, the interface device 31 comprising a local screen 31A designed to display an interactive interface 30 and arranged on said housing in such a manner that a user can access it without unlocking said housing.

The local screen 31A is thus preferably placed on the front face of the housing, however it could alternatively be placed inside the housing, providing it remains visible without any need to unlock the housing, e.g. through a protective window.

The interface device 31 thus enables the interactive interface 30 to be displayed on the local screen 31A, thereby conveying the diagnosis Dc in a manner that can be read by the user on the screen.

The local screen 31A is preferably a touch screen serving both to display the interactive interface 30 and to form action means 31B as a result of said touch screen being touch sensitive, thereby enabling the user to act on the interactive interface 30, and in particular on the display of the diagnosis Dc, e.g. by clicking on elements of said interactive interface 30. Naturally, the interface device 31 may alternatively comprise a screen that is not a touch screen, the interface device 31 then preferably including action means 31B in the form of a pointer device of mouse and/or keypad type. Naturally, the interface device 31, the local screen 31A, and the action means 31B may be in any known form enabling the user to view the interactive interface 30 (and thus the diagnosis Dc) and preferably act on said interactive interface 30, and in particular on viewing said diagnosis Dc. Naturally, the interface device 31 may alternatively include no action means 31B so that the user cannot intervene on the interactive interface 30, and can only view the diagnosis Dc.

Figure 2:
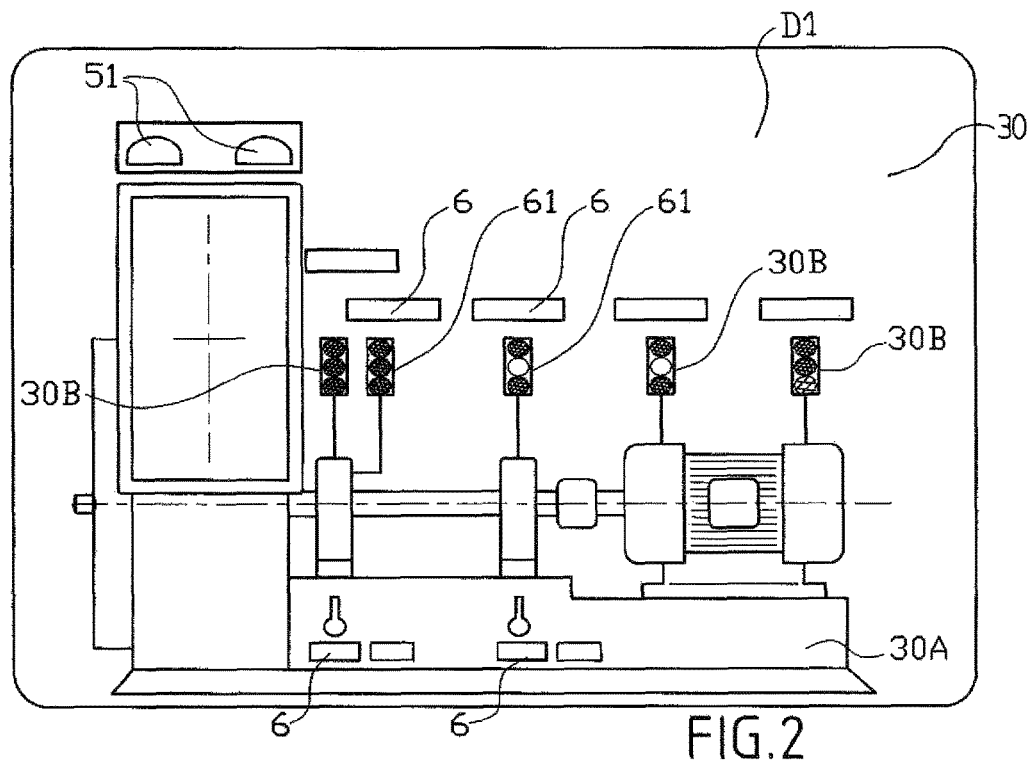
FIG. 2 is a view of an interactive interface of the FIG. 1 diagnosis assistance system of the invention.

Preferably, the interactive interface 30 displays a diagrammatic illustration 30A (as shown in FIG. 2) of said at least one rotary machine M1, M2, M3, in which the functional components are shown, these components being associated within the interactive interface 30 with symbolic representation 30B of their operating states.

The diagrammatic illustration 30A preferably includes an illustration of the locations on said at least one rotary machine M1, M2, M3 of the functional components, appearing within the interactive interface 30 (as shown in FIG. 2).

Figure 7:
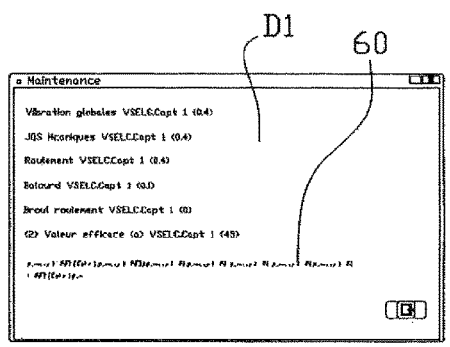
FIG. 7 shows a diagnosis message that can be displayed within the interactive interface of FIG. 2.

By way of example, the symbolic representations 30B consist in displaying values on gauges, displaying traffic lights representing the operating state of said at least one rotary machine M1, M2, M3, or merely displaying the raw values 6 of operating parameters associated with said functional components. The diagnosis Dc including information about the operating state is displayed by means of the interactive interface 30, e.g. in the form of a diagnosis message 60 (the diagnosis message 60 containing a description of one or more malfunctions, and/or the actions to be carried out in order to provide a remedy, as shown in FIG. 7), a symbol (a traffic light 61 where red indicates a critical malfunction, amber indicates an event to be monitored, and green indicates no problem), included in or combined with the diagrammatic illustration 30A and the symbolic representations 30B.

Figure 8:
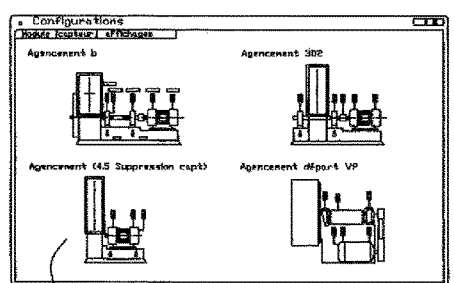
FIG. 8 shows a first configuration screen that can be displayed within the interactive interface of FIG. 2.
Figure 9:
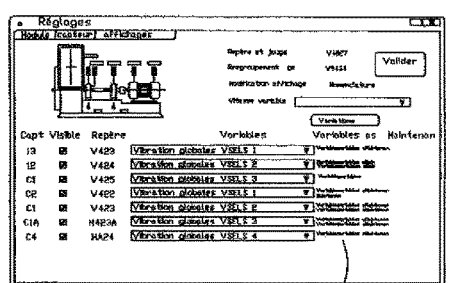
FIG. 9 shows a second configuration screen that can be displayed within the interactive interface of FIG. 2.

The interactive interface 30 preferably enables the diagrammatic illustration 30A of a plurality of rotary machines to be displayed simultaneously or in parallel, whether they are of the same type or of different types, advantageously as a function of the number of rotary machines connected to said reception means 10. The interactive interface 30 preferably includes first and/or second configuration screens 62A, 62B, the first configuration screen 62A enabling the user to specify the number of rotary machines connected to the reception means and their natures (or the number of rotary machines to be displayed on the interactive interface 30), the second configuration screen 62B enabling the user to configure the number, the natures, and the properties of the signals S1, S2, S3 and preferably of the sensors SA1, SA2, SA3 connected to the reception means 10 (as shown in FIGS. 8 and 9).

Preferably, if the diagnosis Dc indicates any malfunction, imminent fault, or emergency, the interface device 31 is designed to issue an alarm in order to draw the user's attention. Naturally, the alarm may preferably be designed so as to trigger as a function of the seriousness of the diagnosis Dc (and possibly in adjustable manner).

Preferably, the interface device 31 has indicator lights 51 representing the diagnosis Dc (e.g. of amber color for an event that is to be monitored, and of red color for a critical malfunction), e.g. arranged on the top of the housing, serving to draw the attention of the user, e.g. and advantageously when the screen is off, or in the event of a major fault. Preferably, the indicator lights 51 are designed to be active in the event of an alarm.

The interface device 31 preferably further includes means for issuing an audible signal that is activated depending on the type of diagnosis Dc that is generated. Preferably, the audible signal is issued in the event of an alarm.

Preferably, the interactive interface 30 enables the user to access distinct diagnosis levels D1, D2.

Preferably, the interactive interface 30 enables the user to access distinct diagnosis levels D1, D2, comprising at least:
a first diagnosis level D1 in which the user can access the diagnosis and read the operating state directly; and
a second diagnosis level D2 in which the user can access the raw values 6.

The interactive interface 30 preferably includes at least a first diagnosis level D1 in which the user can access the diagnosis Dc and read the operating state directly. Preferably, generation of the diagnosis Dc includes associating the operating state with a diagnosis message 60 (as shown in FIG. 7) containing comments and/or advice for the user, the diagnosis message 60 being for displaying in the first diagnosis level D1. Thus, in the first diagnosis level D1, the diagnosis Dc and the operating state as displayed are associated with comments about said operating state, e.g. information about a malfunction of said at least one rotary machine M1, M2, M3, information about maintenance actions to be undertaken in order to ensure that the diagnosed operating state of said at least one rotary machine M1, M2, M3 is sustainable, and/or information enabling the user to contact another user having a level of competence suitable for carrying out maintenance on the machine as a function of the diagnosed operating state.

Figure 4:
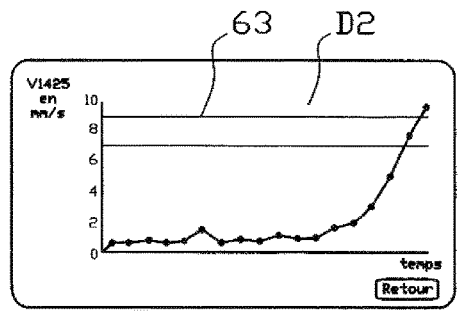
FIG. 4 plots a graph as a function of time of raw values that can be displayed within the interactive interface of FIG. 2.
Figure 5:
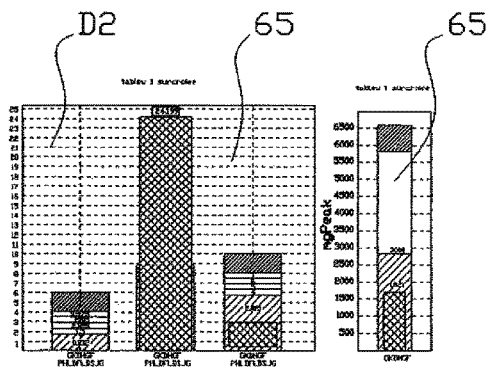
FIG. 5 shows a histogram of raw values that can be displayed within the interactive interface of FIG. 2.
Figure 6:
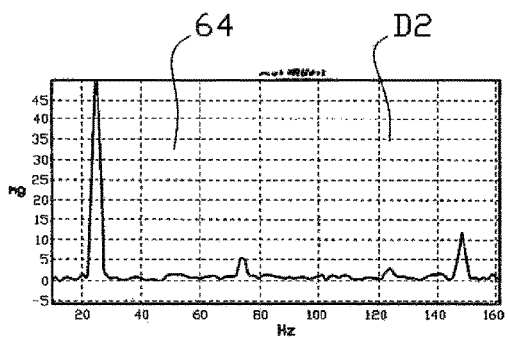
FIG. 6 shows a graph of raw values plotted as a function of frequency that can be displayed within the interactive interface of FIG. 2.

Preferably, the interactive interface 30 includes at least one second diagnosis level D2 in which the user can access the raw values 6, optionally put into the form of a graph 63 as a function of time (as shown in FIG. 4), a graph 64 as a function of the frequency (as shown in FIG. 6), a histogram 65 (in particular for analyzing impacts, as shown in FIG. 5), or a table of raw values 6, in particular for the purpose of enabling a user having the necessary competence to interpret said raw values 6 personally and generate a diagnosis Dc, e.g. in order to compare the user's own interpretation with the automatic interpretations made by the system 100, or to enable the user to reach a personal opinion about the operating state. Preferably, the second diagnosis level D2 also includes a control panel enabling the user to act on operating parameters of said at least one rotary machine M1, M2, M3, e.g. in order to correct a malfunction or to perform maintenance actions. Under such circumstances, the diagnosis assistance system 100 may for example be connected to said at least one rotary machine M1, M2, M3 in such a manner as to be capable of controlling predetermined functional components, by sending orders SO1, SO2 to said at least one rotary machine M1, M2, M3.

For example, when calculating the above-described air flow efficiency, the second diagnosis level may include in particular displaying a time graph directly representing the raw values as picked up, or indeed the calculated air flow efficiency. In this particular example, the first diagnosis level may, for example, comprise displaying the diagnosis as provided by the interpretation means 20 on the basis of the air flow efficiency calculation.

Preferably, a user's access to the diagnosis levels D1, D2 is governed by an access rights system that allows or prevents access in predetermined manner to certain diagnosis levels D1, D2 as a function of a user's access rights.

The access rights system may be in the form an authentication mechanism in which the user needs to be identified (e.g. using an identifier or a password, a magnetic and/or biometric badge) in order to access a given diagnosis level D1, D2. Thus, a so-called "experienced" user may have access to any of the diagnosis levels D1, D2 when so desired, including the second level. Preferably, a so-called "non-experienced" user may access only the first diagnosis level D1, and in particular cannot access the configuration screens 62A and 62B.

In preferred manner, the diagnosis assistance system 100 includes a remote diagnosis device 40 designed to communicate remotely with the interpretation means 20 and/or the reception means 10 in order to recover the diagnosis Dc about the operating state and/or in order to receive the raw values 6 of said at least one operating parameter, possibly for the purpose of interpreting these values.

The remote device 40 may preferably include interpretation means and/or reception means and/or interface means that are similar to those described above.

The remote diagnosis device 40 may be in the form of a remote station connected to the embedded computer 11 via a remote network link. Under such circumstances, the embedded computer 11 has means for communicating with the network, e.g. an Ethernet port or a WiFi port, and it may communicate using an open platform communications (OPC) link. Preferably, and advantageously, the remote station is capable of taking control over the embedded computer 11.

In a second aspect, the invention provides a diagnosis assistance method for providing assistance in diagnosing the operating state of at least one industrial rotary machine M1, M2, M3 such as a fan or a rotary pump, formed by an industrial motor-and-fan unit having a motor and a fanwheel driven in rotation by said motor, or by an industrial motor-and-pump unit having a pump wheel. Said diagnosis assistance method comprises a step of receiving signals S1, S2, S3 representative of raw values 6 of at least one operating parameter of said at least one rotary machine M1, M2, M3, the raw values 6 being picked up within said at least one rotary machine M1, M2, M3, the method being characterized in that it also comprises an automatic interpretation step of automatically interpreting received raw values 6 and a step of generating a diagnosis Dc about the operating state of said at least one rotary machine M1, M2, M3 as a function of said raw values 6.

The signals S1, S2, S3 are thus received by using the reception means 10, which decodes said signals S1, S2, S3 in order to extract the raw values 6 therefrom for at least one operating parameter of said at least one rotary machine M1, M2, M3. Thereafter, the reception means 10 store and/or transmit the raw values 6 to the interpretation means 20, which act automatically to interpret said raw values 6 so as to be capable of generating the diagnosis Dc about the operating state of said at least one rotary machine M1, M2, M3.

Preferably, the automatic interpretation step includes a substep of associating the operating state with a known operating state.

In order to carry out the interpretation, the interpretation means 20 preferably proceed by analyzing the raw values 6, and then by comparing the results of the analysis with known behavior of said at least one rotary machine M1, M2, M3, i.e. with known operating states. Such a comparison thus enables the interpretation means 20 to establish similarities between the operating state and at least one of the operating states that it already knows. Thus, when the interpretation means 20 establishes a similarity between the operating state and one of the known operating states, it deduces that the operating state is the similar known operating state.

Preferably, the association substep comprises:
executing time and/or frequency analysis on the raw values 6 of said at least one operating parameter, thus obtaining an analysis result representative of the operating state; and
comparing the analysis results with result models corresponding to a plurality of known operating states, in order to associate the operating state with one of the known operating states.

Thus, the interpretation means 20 analyze the raw values 6, preferably by analyzing the time and/or frequency behavior of said raw values 6, thus making it possible to identify symptoms representing the operating state of said at least one rotary machine M1, M2, M3, these symptoms possibly being symptomatic of a known operating state. The interpretation means 20 can thus compare the results of the analysis it has undertaken with analysis result models. Since the analysis result models are representative of analysis results that ought theoretically to be obtained when analyzing raw values 6 of a known operating state, the interpretation means 20 can make an association between the operating state of said at least one rotary machine M1, M2, M3 and at least one known operating state of a theoretical rotary machine.

As an alternative, or together with time and/or frequency analysis, the association substep preferably includes executing a comparison between the raw values 6 and threshold values associated with a plurality of known operating states, in order to associate the operating state with one of the known operating states. In this interpretation method, the interpretation means 20 verify whether the raw values 6 cross (or do not cross) threshold values, where crossing (or not crossing) a threshold value is representative of a known operating state that the interpretation means 20 can then associate with the operating state of said at least one rotary machine M1, M2, M3.

Preferably, the method includes a step of a user accessing distinct diagnosis levels D1, D2, comprising at least:
a first diagnosis level D1 in which the user accesses the diagnosis Dc and reads the operating state directly; and
a second diagnosis level D2 in which the user accesses the raw values 6.

Preferably, the method also includes a step of authenticating the user in order to authorize or not authorize the user to access certain of said diagnosis levels D1, D2 as a function of access rights of said user.

Thus, when the user desires to know the operating state of said at least one rotary machine M1, M2, M3, the user is authenticated in the interactive interface 30 by using the interface device 31, e.g. by inputting identifiers and a password via the action means 31B, which may be in the form of a keyboard and a mouse, or a touch screen, for example. The user then accesses a first diagnosis level D1 in which it is possible to read directly the diagnosed operating state of said at least one rotary machine M1, M2, M3, which may for example be shown on the local screen 31A with a diagrammatic illustration 30A of said at least one rotary machine M1, M2, M3, preferably including symbolic representations 30B of the functional components of said at least one rotary machine M1, M2, M3, which representations are associated with their operating states. By way of example, one of the symbolic representations 30B of an operating state may be in the form of traffic lights 61 giving information about the state of a given functional component as shown.

By way of example:
when the traffic light 61 is red, the functional component presents a critical operating problem such that a maintenance action is necessary to resolve said critical problem;
when the traffic light 61 is amber, the functional component needs to be monitored, since there is a risk of said functional component presenting a critical problem in imminent manner; and
when the traffic light 61 is green, the component does not need to be monitored.

Preferably, for the first diagnosis level D1, in the proximity of the functional component shown certain raw values 6 that are considered as being important are also displayed directly.

If a user has appropriate access rights, the user can decide to click (using the action means 31B) on one of the functional components in order to obtain more details about the diagnosed operating state. A screen is then displayed that may, by way of example, include details about the operating state, a diagnosis message 60 including advice on maintenance actions to be undertaken, and/or including the identity of a person to be contacted in order to carry out said maintenance actions (as shown in FIG. 7).

Preferably, if the user has appropriate access rights, the user can also access the second diagnosis level D2, in which the raw values 6 of the operating parameters may be displayed in the form of a graph 63 as a function of time, a graph 64 as a function of frequency, or a histogram 65 (as shown in FIGS. 4, 5, and 6) so as to enable the user to interpret the raw values 6 personally, assuming that the user has the appropriate level of competence.

Preferably, when a user has appropriate access rights, the user may cause certain operating parameters to be modified (such as for example the speed of rotation of the shaft, in the event that said at least one rotary machine M1, M2, M3 is an industrial motor-and-fan unit) by using the interface device 31, e.g. for the purpose of adjusting or correcting the operating state, and possibly solving a malfunction. The user then sends orders S01, SO2 to said at least one rotary machine M1, M2, M3 from the interactive interface 30.

Also preferably, the diagnosis assistance system 100 is designed so that the user can act on the remote diagnosis device 40 to perform some or all of the actions that can be performed from the interface device 31.

The invention also provides operating software 12 enabling the automatic interpretation step and the step of generating the diagnosis Dc of the above-described diagnosis assistance method to be performed. For this purpose, the software preferably includes the association algorithm 2 and it is preferably loaded into the embedded computer 11. The operating software 12 preferably also includes managing the display of the interactive interface 30. The operating software 12 is also preferably executable on the remote diagnosis device 40.

Finally, the invention provides a medium that can be read by a computer and that stores the above-described operating software 12, the operating software 12 serving to carry out the automatic interpretation step and the step of generating the diagnosis Dc of the diagnosis assistance method. As non-limiting examples, the medium may be a universal serial bus (USB) stick, a compact disk (CD), or a server, or any medium hosting means for installing and executing the software locally or remotely.

SUSCEPTIBILITY OF INDUSTRIAL APPLICATION

The industrial application of the invention lies in designing, making, and using diagnosis assistance systems, in particular in a context of industrial maintenance for rotary machines of the motor-and-fan unit or motor-and-pump unit kinds.

What is claimed is:

1. A diagnosis assistance system (100) for diagnosing an operating state of at least one industrial rotary machine (M1, M2, M3) formed by an industrial motor-and-fan unit comprising a motor and a fanwheel driven in rotation by said motor, or by an industrial motor-and-pump unit including a pump wheel, said diagnosis assistance system (100) comprising;
    a base support (50);
    a reception means (10) secured to the base support (50), the reception means (10) being designed to receive signals (S1, S2, S3) representative of raw values (6) of at least one operating parameter of said at least one rotary machine (M1, M2, M3), the raw values (6) being picked up within said at least one rotary machine (M1, M2, M3);
    interpretation means (20) for:
        interpreting the operating state;
        automatically interpreting the received raw values (6); and
        generating a diagnosis (Dc) about the operating state of said at least one rotary machine (M1, M2, M3) as a function of said raw values (6); and
    an interface device (31) having a local screen (31A) designed to display an interactive interface (30) that enables the user to access distinct diagnosis levels (D1, D2), comprising at least:
        a first diagnosis level (D1) in which the user can access the diagnosis and read the operating state directly; and
        a second diagnosis level (D2) in which the user can access the raw values (6).

2. The diagnosis assistance system (100) according to claim 1, wherein the interpretation means (20) comprises:
    an association algorithm (2); and
    a state database (2B) containing a plurality of known operating states, the association algorithm (2) including an association module (2A) enabling the operating state to be associated with one of the known operating states of the state database (2B).

3. The diagnosis assistance system (100) according to claim 2, wherein the association algorithm (2) includes at least one time and/or frequency analysis module (2D) enabling time and/or frequency analysis to be performed on the raw values (6) and enabling an analysis result to be generated representative of the operating state, the association module (2A) serving to compare the analysis result with result models of the state database (2B), the result models corresponding to the plurality of known operating states, the association module (2A) serving to associate the operating state with one of the known operating states.

4. The diagnosis assistance system (100) according to claim 2, wherein the association algorithm (2) comprises a comparison module (2C) for comparing the raw values (6) with threshold values of the state database (2B), the threshold values corresponding to the plurality of known operating states, the association module (2A) serving to associate the operating state with one of the known operating states.

5. The diagnosis assistance system (100) according to claim 2, further comprising:
    an embedded computer (11), the interpretation means (20) being in the form of operating software (12) loaded in the embedded computer (11) to execute the association algorithm (2).

6. The diagnosis assistance system (100) according to claim 1, wherein:
    the base support (50) comprises a housing of a cabinet or box type that is designed to be closed and locked using a door (51) of said housing; and
    the interactive interface (30) is arranged on said housing in such a manner that a user can access it without unlocking said housing.

7. The diagnosis assistance system (100) according to claim 1, further comprising:
an access rights system that authorizes access to the distinct diagnosis levels (D1, D2) as a function of access rights of the user.

8. A diagnosis assistance system (100) for diagnosing an operating state of at least one industrial rotary machine (M1, M2, M3) formed by an industrial motor-and-fan unit comprising a motor and a fanwheel driven in rotation by said motor, or by an industrial motor-and-pump unit including a pump wheel, said diagnosis assistance system (100) comprising:
a base support (50);
a reception means (10) secured to the base support (50), the reception means (10) being designed to receive signals (S1, S2, S3) representative of raw values (6) of at least one operating parameter of said at least one rotary machine (M1, M2, M3),the raw values (6) being picked up within said at least one rotary machine (M1, M2, M3);
interpretation means (20) for:
interpreting the operating state;
automatically interpreting the raw values (6) of the at least one operating parameter, which includes any combination of a speed, an acceleration, a vibration, a temperature, a torque, a force, and/or a sound measurement type for one or more functional components of said at least one rotary machine (M1, M2, M3); and
generating a diagnosis (Dc) about the operating state of said at least one rotary machine (M1, M2, M3) as a function of said raw values (6).

9. The diagnosis assistance system (100) according to claim 8, further comprising:
a remote diagnosis device (40) designed to communicate remotely with the interpretation means (20) and/or with the reception means (10) in order to receive: (1) the diagnosis (Dc) about the operating state; and/or (2) the raw values (6) of said at least one operating parameter.

10. The diagnosis assistance system (100) according to claim 8, wherein the reception means (10) comprises:
ports (1A) designed to receive the signals (S1, S2, S3) and to extract the raw values (6) therefrom; and
a memory (1B) in which the raw values (6) received over a predetermined duration are stored, the interpretation means (20) being designed to use the raw values (6) received over the predetermined duration.

11. The diagnosis assistance system (100) according to claim 10, wherein the ports (1A) are suitable for receiving the signals (S1, S2, S3) in the form of electrical or electromagnetic signals transmitted by sensors (SA1, SA2, SA3) arranged within said at least one rotary machine (M1, M2, M3).

12. The diagnosis assistance system (100) according to claim 8, wherein the at least one industrial rotary machine includes one to four industrial rotary machines, the one or more operating parameter includes one to six operating parameters, and the reception means (10) comprises:
a sufficient number of ports (1A) to receive the raw values (6) of the one to six operating parameters from the one to four industrial rotary machines.

13. A diagnosis assistance system (100) for diagnosing an operating state of at least one industrial rotary machine (M1, M2, M3) formed by an industrial motor-and-fan unit comprising a motor and a fanwheel driven in rotation by said motor, or by an industrial motor-and-pump unit including a pump wheel, said diagnosis assistance system (100) comprising:
a base support (50) comprising a housing of a cabinet or box type that is designed to be closed and locked using a door (51) of said housing;
a reception means (10) disposed inside the housing of the base support (50), the reception means (10) being designed to receive signals (S1, S2, S3) representative of raw values (6) of at least one operating parameter of said at least one rotary machine (M1, M2, M3), the raw values (6) being picked up within said at least one rotary machine (M1, M2, M3); and
interpretation means (20) for:
interpreting the operating state;
automatically interpreting the received raw values (6); and
generating a diagnosis (Dc) about the operating state of said at least one rotary machine (M1, M2, M3) as a function of said raw values (6).

14. The diagnosis assistance system (100) according to claim 13, wherein the interpretation means (20) are also disposed inside the housing.

15. The diagnosis assistance system (100) according to claim 13, further comprising:
an interface device (31) enabling a user to access the diagnosis (Dc), the interface device (31) having a local screen (31A) designed to display an interactive interface (30) and arranged on said housing in such a manner that a user can access it without unlocking said housing.

16. The diagnosis assistance system (100) according to claim 15, wherein the local screen (31A) is a touch screen.

17. The diagnosis assistance system (100) according to claim 15, wherein said interactive interface (30) enables the user to access distinct diagnosis levels (D1, D2), comprising at least:
a first diagnosis level (D1) in which the user can access the diagnosis and read the operating state directly; and
a second diagnosis level (D2) in which the user can access the raw values (6).

18. The diagnosis assistance system (100) according to claim 17, further comprising:
an access rights system that authorizes access to the distinct diagnosis levels (D1, D2) as a function of access rights of the user.

19. A diagnosis assistance method for diagnosing an operating state of at least one industrial rotary machine (M1, M2, M3) formed by an industrial motor-and-fan unit comprising a motor and a fanwheel driven in rotation by said motor, or by an industrial motor-and-pump unit including a pump wheel, said diagnosis assistance method comprising:
receiving signals (S1, S2, S3) representative of raw values (6) of at least one operating parameter of said at least one rotary machine (M1, M2, M3), the raw values (6) being picked up within said at least one rotary machine (M1, M2, M3);
automatically interpreting received raw values (6), wherein the automatically interpreting includes an association substep that associates the operating state with a known operating state; and
generating a diagnosis (Dc) about the operating state of said at least one rotary machine (M1, M2, M3) as a function of said raw values (6).

20. The diagnosis assistance method according to claim 19, wherein the association substep comprises:

executing time and/or frequency analysis of the raw values (6) of said at least one operating parameter, thereby obtaining an analysis result representing the operating state; and comparing the analysis results with result models corresponding to a plurality of known operating states in order to associate the operating state with one of the known operating states.

21. A medium suitable for being read by a computer and storing operating software (12), wherein the operating software (12) enables the automatic interpreting and the generating the diagnosis (Dc) of the diagnosis assistance method claim 19 to be performed.

22. The diagnosis assistance method according to claim 19, wherein the association substep comprises:

comparing raw values (6) with threshold values associated with a plurality of known operating states in order to associate the operating state with one of the known operating states.

23. The method of claim 19, further comprising:

providing access to distinct diagnosis levels (D1, D2) comprising at least:

a first diagnosis level (D1) that allows a user to access the diagnosis and read the operating state directly; and a second diagnosis level (D2) that allows the user to access the raw values (6).

24. A diagnosis assistance method for diagnosing an operating state of at least one industrial rotary machine (M1, M2, M3) formed by an industrial motor-and-fan unit comprising a motor and a fanwheel driven in rotation by said motor, or by an industrial motor-and-pump unit including a pump wheel, said diagnosis assistance method comprising:

receiving signals (S1, S2, S3) representative of raw values (6) of at least one operating parameter of said at least one rotary machine (M1, M2, M3), the raw values (6) being picked up within said at least one rotary machine (M1, M2, M3);

automatically interpreting received raw values (6); and generating a diagnosis (Dc) about the operating state of said at least one rotary machine (M1, M2, M3) as a function of said raw values (6);

providing access to distinct diagnosis levels (D1, D2) comprising at least:

a first diagnosis level (D1) that allows a user to access the diagnosis and read the operating state directly; and a second diagnosis level (D2) that allows the user to access the raw values (6).

25. The diagnosis assistance method according to claim 24, further comprising:

authenticating the user based on access rights prior to providing the user with the access to the first diagnosis level (D1) and/or the second diagnosis level (D2).

* * * * *